No. 673,076. Patented Apr. 30, 1901.
J. FAWELL.
VALVE GEAR FOR ENGINES.
(Application filed Jan. 5, 1900.)
(No Model.) 3 Sheets—Sheet 2.

WITNESSES: INVENTOR

No. 673,076.  
J. FAWELL.  
VALVE GEAR FOR ENGINES.  
(Application filed Jan. 5, 1900.)  
Patented Apr. 30, 1901.

(No Model.)

3 Sheets—Sheet 3.

WITNESSES:  
INVENTOR

UNITED STATES PATENT OFFICE.

JOSEPH FAWELL, OF PITTSBURG, PENNSYLVANIA.

VALVE-GEAR FOR ENGINES.

SPECIFICATION forming part of Letters Patent No. 673,076, dated April 30, 1901.

Application filed January 5, 1900. Serial No. 490. (No model.)

*To all whom it may concern:*

Be it known that I, JOSEPH FAWELL, a citizen of the United States, residing at Pittsburg, in the county of Allegheny and State of Pennsylvania, have invented or discovered certain new and useful Improvements in Valve-Gear for Steam-Engines, of which improvements the following is a specification.

The invention described herein relates to certain improvements in the reversing mechanism for engines for blooming-mills; and has for its object a construction whereby the valve-operating mechanism—*i. e.*, the links, &c.—of the main engine can be rapidly shifted in either direction without any appreciable shock to the reversing mechanism or the parts shifted thereby.

The invention is hereinafter more fully described and claimed.

Figure 1:
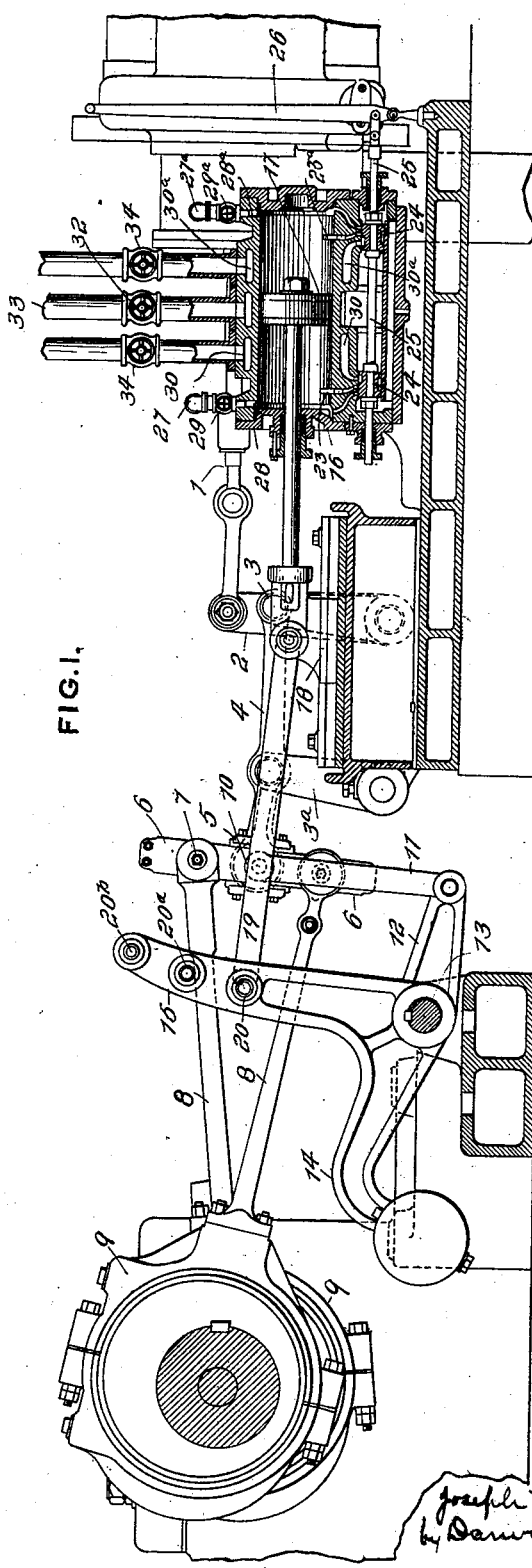
Figure 2:
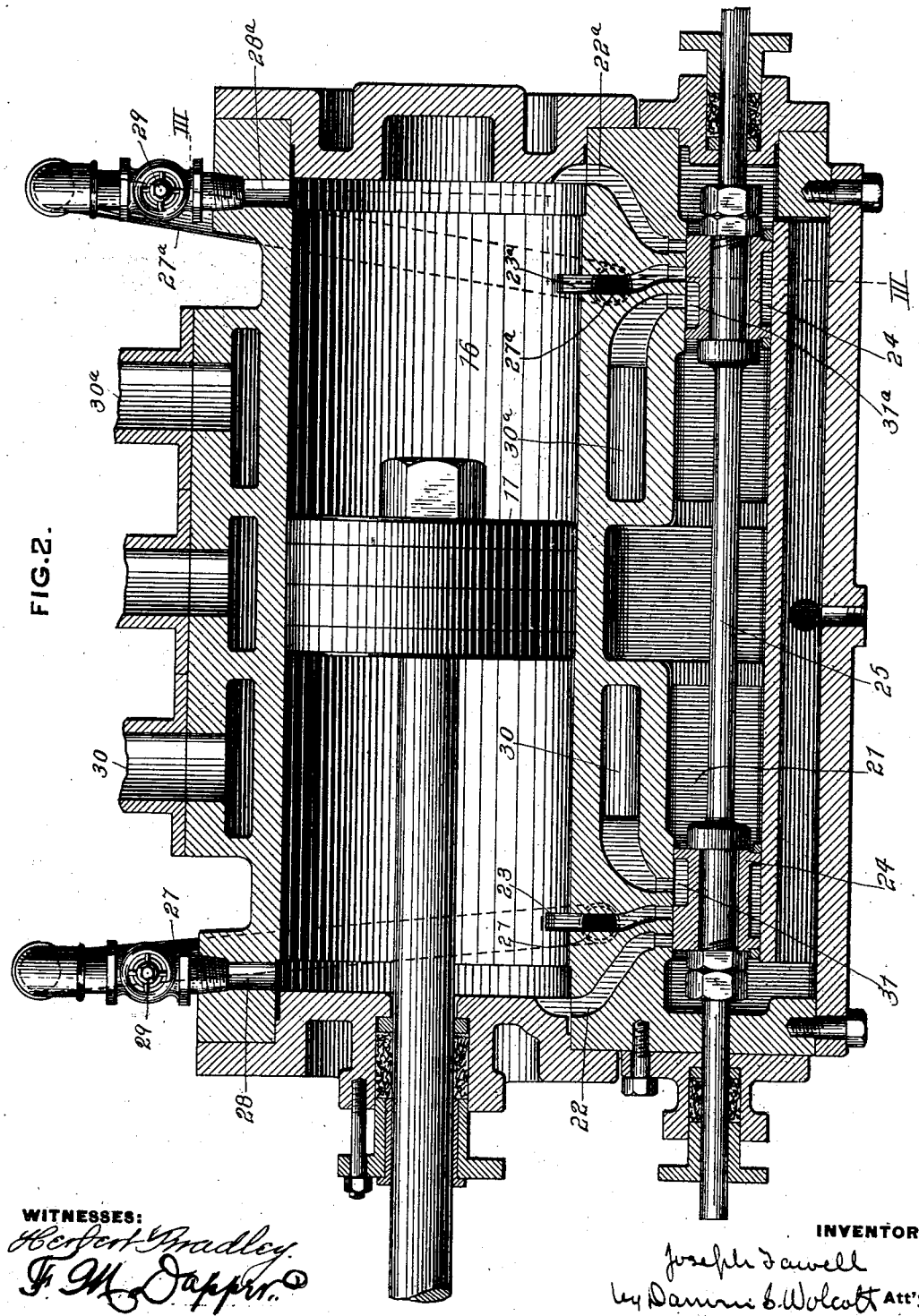
Figure 3:
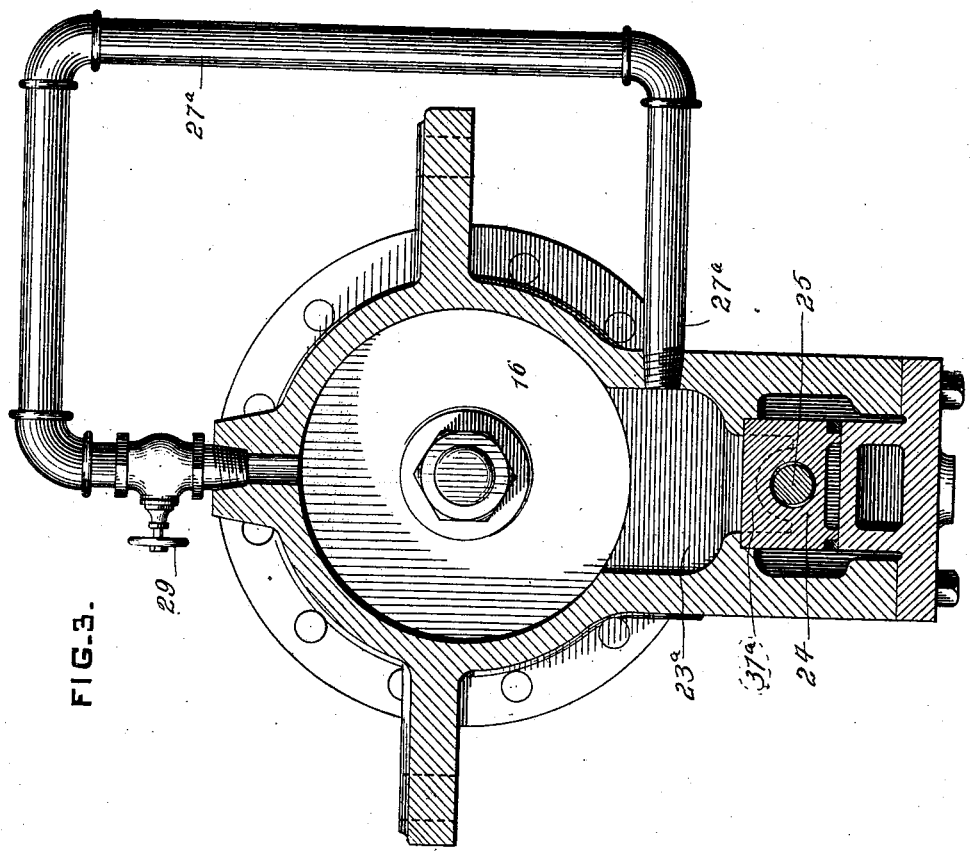

In the accompanying drawings, forming a part of this specification, Figure 1 is a view, partly in section and partly in elevation, showing the reversing mechanism and the parts of the main engine shifted thereby. Fig. 2 is a sectional view, on an enlarged scale, of the reversing cylinder and piston and its controlling-valve mechanism; and Fig. 3 is a transverse section, the plane of section being indicated by the line III III, Fig. 2.

In the practice of my invention the stem 1 of the valve of the main engine is connected to arm 2 of a rocker-shaft, the other arm 3 of said shaft being connected to a rod 4, the opposite end of which is connected to a block 5. The rod 4 and block 5 are supported with a freedom of back-and-forth movement by a rocker-arm $3^a$. The sides of the link 6 are arranged in guide-grooves in the sides of the block 5 and are provided near their ends with trunnions 7 for the reception of the ends of rods 8, extending from the eccentric-straps 9. Trunnions 10 are formed on the sides of the link, intermediate of the trunnions 7, for engagement with the upper ends of lifting-bars 11, which have their lower ends connected to an arm 12 on the rock-shaft 13. The link 6, which is counterbalanced by a weighted arm 14, also secured to the shaft 13, is raised and lowered to effect a reversal of the main engine by a motor connected to an arm 15, having its inner end secured to the rock-shaft 13. The motor for shifting the link consists of a fluid-pressure cylinder 16 and a piston 17, which is preferably connected to arm 15 by means of a sliding block 18, connected to the piston-rod and also to one end of a bar 19, having its opposite end connected to the arm 15.

In order to provide for an adjustment of the traverse of the valve of the main engine in accordance with the work being done, the arm 15 is provided at a series of two or more points with suitable means for attaching the end of the bar 19 thereto. The means employed for connecting the bar to the arm may be of any suitable construction—as, for example, the bar may be formed with an eye through which bolts 20 $20^a$, &c., can pass. These bolts or other attaching means are arranged on the arm in an arc of a circle whose center coincides with the point of connection of the bar 19 with the sliding block 18. By shifting the connection of the bar with the arm from the point or bolt 20 to the point or bolt $20^b$ the less will be the range of vertical movement of the link with a constant stroke of the piston.

As shown in Fig. 2, the valve-chest 21 is connected to the ends of the cylinder by inlet-ports 22 $22^a$ and exhaust-ports 23 $23^a$, the flow of steam through said ports being controlled by a valve 24, which is preferably made in two sections connected by a stem 25, which has one end connected to a hand-lever 26 or other shifting mechanism. It will be observed that the exhaust-ports 23 $23^a$ are so located as to be closed by the piston 17 before it reaches the ends of its movement, so that a quantity of steam will be inclosed between the ends of the cylinder and the piston, forming a cushion for the latter. In order to permit the piston to complete its stroke, the exhaust-ports 23 $23^a$ are connected by pipes or passages 27 $27^a$ to auxiliary exhaust-ports 28 $28^a$, located at the ends of the cylinder, thereby providing for the escape of steam from the cylinder after the ports 23 or $23^a$ have been closed by the piston. The speed of the piston during the final portions of its stroke is controlled by means of valves 29 $29^a$, located in the pipes or passages 27 $27^a$. The exhaust-ports are connected to the outlet-passages 30 $30^a$ by recesses 31 $31^a$ in the valve, said recesses being so located as to connect the ports and passages at one end of the cylinder only when the valve is in position to permit the flow of steam through the inlet-port at the opposite end of the cylinder. It will be observed that the pipes or passages 27 27ª connect with the exhaust-ports 23 23ª at points intermediate of the ends of the latter, so that when the exhaust-ports are closed by the valve 24 no steam can escape from the cylinder.

The valve and piston of the shifting cylinder and the valve mechanism of the main engine operated by the shifting cylinder and piston are in intermediate or non-operative positions. If the lever 26 be shifted to the left, the steam-inlet port 22ª will be opened and the exhaust-port 23 will be connected to the outlet-passage 30. As the piston moves to the left it will cover the exhaust-port 23, so that the exhaust-steam must pass through the auxiliary port 28, passage 27, and port 23 to the outlet. By partially closing the passage 27 the final rate of movement of the piston can be reduced to any desired degree. The rate of movement of the piston from the time it starts until caught by the cushion can be regulated by means of an auxiliary valve 32 in the steam-supply pipe 33 or by valves 34 in the exhaust pipes or passages 30 30ª, or by both. By adjusting the valves in the exhaust-pipes the back pressure on the piston can be increased or diminished, thereby effecting a corresponding change in the speed of the piston.

It is characteristic of my improvements that the speed of the piston of the shifting cylinder for any portions of its stroke can be regulated independent of the reversing-valve 24 and that an effective but gradually-diminishing cushion is automatically formed at the ends of the cylinder by the piston itself.

I claim herein as my invention—

1. As a means of reversing a steam-engine, the combination of a piston connected to the valve-operating mechanism of the main engine, a cylinder provided with independent inlet and exhaust ports, the exhaust-ports being so located as to be closed by the piston in its traverse and having at its ends valved auxiliary exhaust-ports, a main valve and auxiliary valves controlling the inlet and exhaust ports, substantially as set forth.

2. As a means for reversing a steam-engine, the combination of a piston, a cylinder provided with independent inlet and exhaust ports, the latter being so located as to be closed by the piston in its traverse and having at its ends auxiliary exhaust-ports connected to the main exhaust-ports, a main valve and auxiliary valves controlling the inlet and exhaust ports, substantially as set forth.

3. As a means for reversing a steam-engine, the combination of a piston, a cylinder provided with independent inlet and exhaust ports, the latter being so located as to be covered by the piston in its traverse, and having auxiliary exhaust-ports having valved connections to the main exhaust-ports, a main valve controlling the inlet and exhaust ports, and auxiliary valves controlling the outflow of steam, substantially as set forth.

4. As a means for reversing a steam-engine, the combination of a reversing-valve mechanism, a rock-shaft connected thereto, an arm secured to said shaft, a cylinder and piston, a bar having one end connected to said piston and means for detachably connecting the opposite end of the bar to one of a series of points of attachment on the arm, substantially as set forth.

In testimony whereof I have hereunto set my hand.

JOSEPH FAWELL.

Witnesses:
DARWIN S. WOLCOTT,
F. E. GAITHER.